United States Patent
Ogata

(10) Patent No.: US 10,930,308 B2
(45) Date of Patent: Feb. 23, 2021

(54) SLIDE ACTUATOR

(71) Applicant: OLYMPUS CORPORATION, Tokyo (JP)

(72) Inventor: Ken Ogata, Chofu (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 17/069,525

(22) Filed: Oct. 13, 2020

(65) Prior Publication Data

US 2021/0027804 A1    Jan. 28, 2021

Related U.S. Application Data

(63) Continuation of application No. PCT/JP2018/016033, filed on Apr. 18, 2018.

(51) Int. Cl.
*G11B 5/48* (2006.01)
(52) U.S. Cl.
CPC .......... *G11B 5/4813* (2013.01); *G11B 5/4826* (2013.01)
(58) Field of Classification Search
CPC ............................. G11B 5/4813; G11B 5/4826
USPC ................................. 360/265–265.7
See application file for complete search history.

(56) References Cited

U.S. PATENT DOCUMENTS

| 8,657,056 B2* | 2/2014 | Laspesa | F15B 15/1476 180/274 |
|---|---|---|---|
| 2018/0334250 A1* | 11/2018 | Klode | B64C 25/24 |
| 2020/0103008 A1* | 4/2020 | Iuga | F16H 25/20 |

FOREIGN PATENT DOCUMENTS

| JP | 55-51119 A | 4/1980 |
|---|---|---|
| JP | 55-60718 A | 5/1980 |
| JP | 1-156311 U | 10/1989 |
| JP | 2003-264207 A | 9/2003 |
| JP | 2008-057679 A | 3/2008 |

OTHER PUBLICATIONS

International Search Report dated Jul. 17, 2018 received in PCT/2018/016033.

* cited by examiner

*Primary Examiner* — Allen T Cao

(74) *Attorney, Agent, or Firm* — Scully, Scott, Murphy & Presser, P.C.

(57) ABSTRACT

A slide actuator includes a fixed member, a movable member capable of reciprocating in a predetermined direction with respect to the fixed member, a plurality of balls interposed between the fixed member and the movable member and configured to movably support the movable member, a retainer interposed between the respective balls and configured to keep an interval between the respective balls constant and reciprocate in a predetermined stroke range, a wall portion of the fixed member provided in a moving direction of the retainer, and a retainer spring configured to couple the wall portion and the retainer. The retainer spring is disposed to suppress displacement of the retainer in the moving direction. A spring constant of the retainer spring is set to a value for causing sliding friction in the balls and pushing back the retainer in a range in which the retainer moves beyond the predetermined stroke range.

11 Claims, 8 Drawing Sheets

SLIDE ACTUATOR

CROSS REFERENCE TO RELATED APPLICATION

This application is a continuation application of PCT/JP2018/016033 filed on Apr. 18, 2018, the entire contents of which are incorporated herein by this reference.

BACKGROUND OF THE INVENTION

1. Field of the Invention

The present invention relates to a slide actuator in which a movable member is caused to be supported movably with respect to a fixed member via balls and a retainer that keeps an interval between the balls constant.

2. Description of the Related Art

There has conventionally been known a slide actuator that holds a body to be moved (for example, an optical element) in a movable member disposed slidably with respect to a fixed member and causes the body to be moved to linearly move in a reciprocating manner in a state in which the body to be moved is maintained in a posture orthogonal to a moving direction. The slide actuator is adopted in a well-known voice coil motor (VCM) and the like.

As shown in FIGS. 10A to 10C, a slide actuator 101 of this type includes a fixed member 102 fixed to an apparatus main body, a movable member 103 opposed to the fixed member 102, and a linear guide 104 that is interposed between the fixed member 102 and the movable member 103 and supports the movable member 103 to be linearly movable along the fixed member 102. Further, the linear guide 104 includes a plurality of balls 105 that allow the linear motion of the movable member 103 and a retainer 106 that turnably holds the respective balls 105 at a predetermined interval.

A stroke range Ls of the movable member 103 is set by a sine-wave movable member instruction value (current) shown in FIG. 6A. The movable member instruction current is fed to the slide actuator. Then, the movable member 103 repeats a reciprocating linear motion of sliding in, for example, a plus (+) direction as shown in FIG. 10B from a state in which the movable member 103 is located in a center of the stroke range Ls shown in FIG. 10A, turning back in a minus (−) direction at an end portion of the stroke range Ls, and further turning back in the plus direction at an end portion of the stroke range Ls as shown in FIG. 10C.

When the movable member 103 of the slide actuator 101 is repeating the reciprocating linear motion, in some case, the slide actuator 101 receives strong disturbance such as a shock or vibration and, as shown in FIG. 11A, the movable member 103 or the retainer 106 is pressed in one direction by an external force caused by the disturbance, and deviation occurs in a positional relation between the movable member 103 and the retainer 106.

In a state in which the deviation occurs between the movable member 103 and the retainer 106, when the movable member 103 turns back in the minus direction as shown in FIG. 11B, an end portion of the retainer 106 comes into contact with a wall portion 102a of the fixed member 102 and the movement of the retainer 106 is stopped earlier than the movable member 103 reaches the end portion of the stroke range Ls.

When the movement of the retainer 106 is stopped, as shown in FIG. 11C, the movable member 103 reaches the end portion of the stroke rage Ls while causing a slip between the movable member 103 and the balls 105. Thereafter, when the movable member 103 turns back in the plus direction as shown in FIG. 11D, the retainer 106 moves in the plus direction with a half of a movement amount of the movable member 103 according to rotation of the balls 105.

For example, Japanese Patent Application Laid-Open Publication No. 2008-57679 discloses a technique for, when deviation in a slide direction occurs between a movable member (a slide table) and a retainer (a cage), first, pressing the retainer of a linear guide against a moving end and, subsequently, forcibly sliding the movable member, and correcting the deviation.

When the balls 105 is repeatedly reciprocated on the fixed member 102 following the reciprocating linear motion of the movable member 103, grease is pushed to the wall portion 102a side of the fixed member 102 by the balls 105. A grease reservoir G is gradually easily formed in the wall portion 102a. Accordingly, as shown in FIG. 11B, when the end portion of the retainer 106 comes into contact with the wall portion 102a, the retainer 106 is sunk into the grease reservoir G.

SUMMARY OF THE INVENTION

An aspect of the present invention is a slide actuator including: a fixed member; a movable member capable of reciprocating in a predetermined direction with respect to the fixed member; a plurality of balls interposed between the fixed member and the movable member and configured to movably support the movable member; a retainer interposed between the respective balls and configured to keep an interval between the respective balls constant and reciprocate in a predetermined stroke range; a wall portion of the fixed member provided in a moving direction of the retainer; and a structure having spring properties configured to couple the wall portion and the retainer. The structure is disposed to suppress displacement of the retainer in the moving direction. A spring constant of the structure is set to a value for causing sliding friction in the balls and pushing back the retainer in a range in which the retainer moves beyond the predetermined stroke range.

DETAILED DESCRIPTION OF THE PREFERRED EMBODIMENTS

Figure 1:
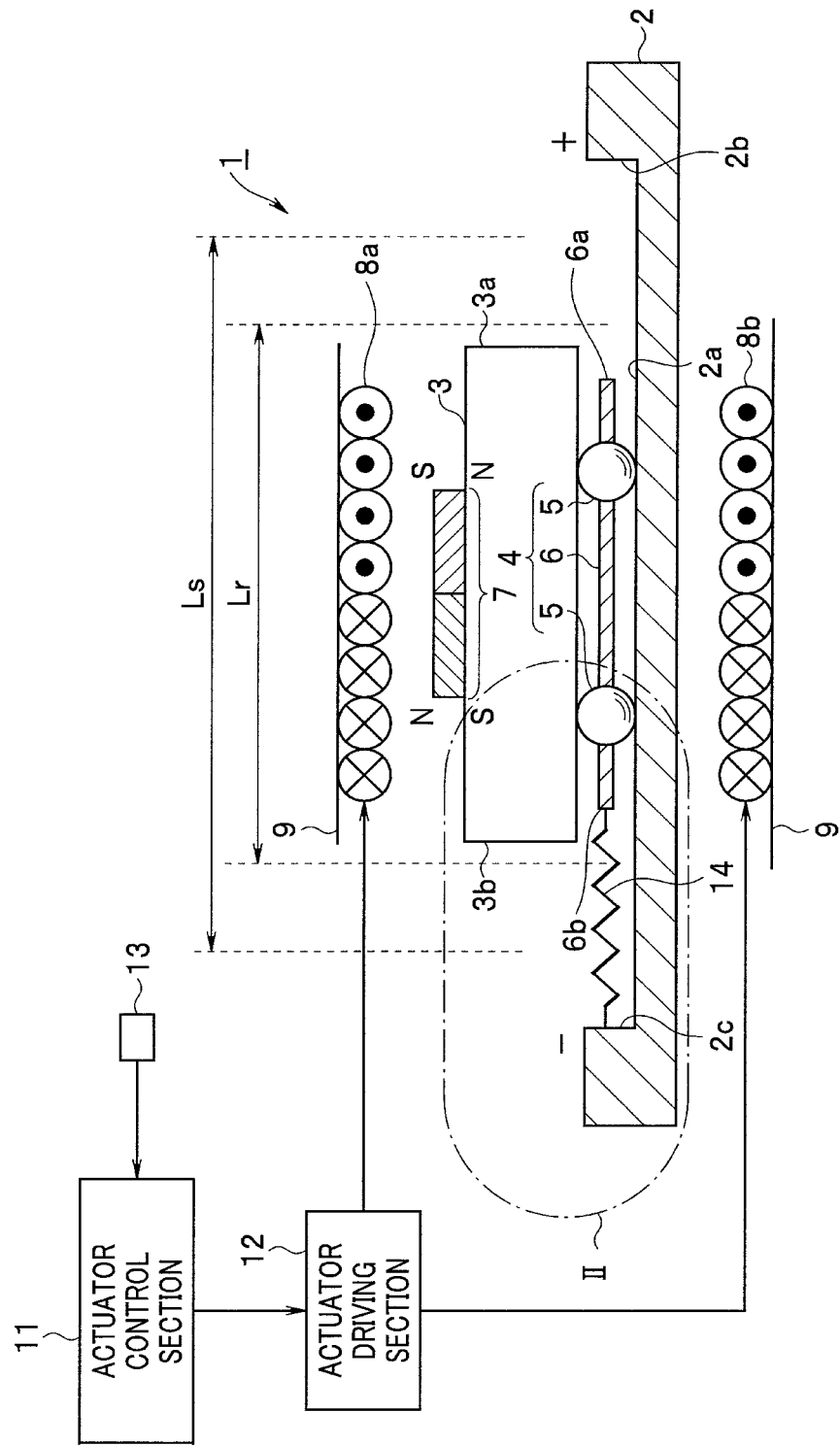
FIG. 1 is a schematic side view of a slide actuator according to a first embodiment.

Embodiments of the present invention will be explained below with reference to the drawings. It should be noted that the drawings are schematic and relations between thicknesses and widths of respective members, ratios of thicknesses of the respective members, and the like are different from actual ones. It goes without saying that portions where relations and ratios of dimensions of the drawings are different are included among the drawings.

[First Embodiment]

A first embodiment of the present invention is shown in FIGS. 1 to 6B. A reference numeral 1 in the figures denotes an electromagnetic slide actuator represented by a voice coil motor. The slide actuator 1 includes a fixed member 2 fixed to a not-shown apparatus main body, a movable member 3 linearly movable on the fixed member 2, and a linear guide 4 interposed between the fixed member 2 and the movable member 3. The linear guide 4 is configured by a plurality of balls 5 that support the movable member 3 to be movable along a stage 2a of the fixed member 2 and a retainer 6 that turnably supports the respective balls 5 at a predetermined interval. Note that although not illustrated, a track groove for linearly guiding movement of the balls 5 is formed in the stage 2a. The balls 5 are disposed in the track groove.

The movable member 3 holds, for example, an optical element as a body to be moved. A permanent magnet 7 is fixed to an upper surface of the movable member 3. Further, a pair of flat coils 8a and 8b are disposed in a state in which the pair of flat coils 8a and 8b are opposed to the permanent magnet 7. The permanent magnet 7 is disposed to give an appropriate magnetic field to the flat coils 8a and 8b. The respective flat coils 8a and 8b are attached to a coil supporting portion 9 fixed to the not-shown apparatus main body. Note that the slide actuator 1 according to this embodiment is a movable magnet type but may be a movable coil type in which a flat coil is attached to the movable member 3 and a permanent magnet is caused to be opposed to the flat coil.

An output side of an actuator control section 11 is connected to the respective flat coils 8a and 8b via an actuator driving section 12. Further, a position detection sensor 13, which detects a moving position of the movable member 3, is connected to an input side of the actuator control section 11.

The actuator control section 11 is configured mainly by a well-known microcomputer including a well-known CPU, a well-known ROM, a well-known RAM, and a well-known interface. The actuator control section 11 compares position information of the movable member 3 detected by the position detection sensor 13 and a movable member instruction position shown in FIG. 6A, calculates a control deviation $\Delta Ls$ shown in FIG. 6B, and outputs a control signal for correcting the control deviation $\Delta Ls$ to the actuator driving section 12.

Then, the actuator driving section 12 outputs a driving current corresponding to the control signal to the flat coils 8a and 8b. A Lorentz force is generated by a magnetic field of the permanent magnet 7 and the movable member 3 slides. A moving direction of the movable member 3 is determined by a direction of an electric current fed to the flat coils 8a and 8b and magnitude of force changes according to an amount of the current. Note that configurations of a driving system and a control system for the permanent magnet 7, the flat coils 8a and 8b, the coil supporting portion 9, the actuator control section 11, the actuator driving section 12, and the position detection sensor 13 are representatively shown in FIG. 1 and are omitted in FIGS. 2 to 5 and second and subsequent embodiments explained below.

Figure 6A:
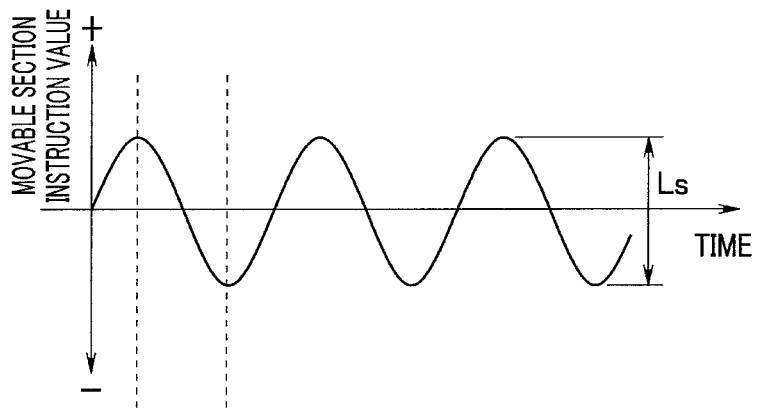
FIG. 6A is a waveform chart showing a sine-wave movable member instruction value for causing the movable member to operate according to the first embodiment.
Figure 6B:
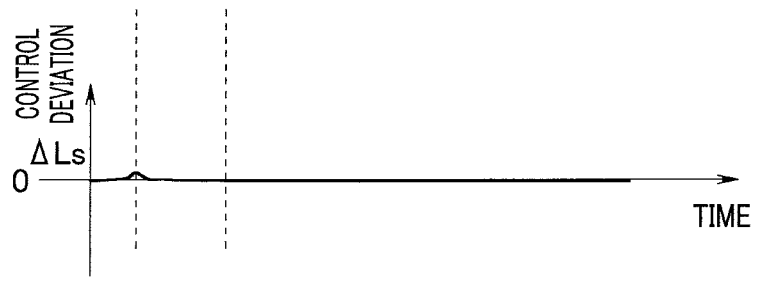
FIG. 6B is a waveform chart showing a control deviation between the movable member instruction value and an actual position of the movable member according to the first embodiment.

For example, when the actuator driving section 12 feeds the sine-wave movable member instruction value (a driving current) as shown in FIG. 6A to the flat coils 8a and 8b according to a PWM signal outputted from the actuator control section 11, the movable member 3 repeats the reciprocating linear motion in a stroke range Ls. In this case, when it is assumed that a slip does not occur between the movable member 3 and the balls 5 and between the balls 5 and the track groove, a movement amount of the retainer 6 is a half of a movement amount of the movable member 3 because of the rotation of the balls 5. The retainer 6 follows the movable member 3 in a reciprocating manner in a stroke range Lr. Note that, in the following explanation, for convenience, a moving direction of the movable member 3 and the linear guide 4 is explained assuming that a right side of the figures is a plus (+) direction and a left side of the figures is a minus (−) direction.

Figure 3A:
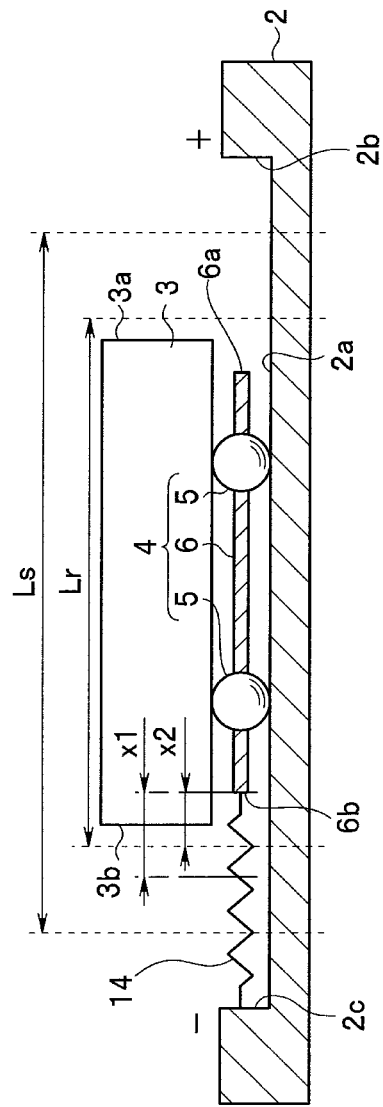
FIG. 3A is a schematic side view of the slide actuator showing a state in which a movable member is in an initial position according to the first embodiment.

A mechanical retainer spring 14 functioning as a structure having spring properties is coupled either between an end portion 6a in a moving direction of the retainer 6 and a wall portion 2b of the fixed member 2 opposed to the end portion 6a, or between an end portion 6b in the moving direction of the retainer 6 and a wall portion 2c of the fixed member 2 opposed to the end portion 6b (in this embodiment, between the end portion 6b and the wall portion 2c). The retainer spring 14 is a spring for both of tension and compression. Initial positions of the linear guide 4 and the movable member 3 in a free state are shown in FIG. 1 and FIG. 3A.

In other words, the retainer spring 14 functions as a tension spring when the linear guide 4 is about to move in the plus (+) direction in the figures and functions as a compression spring when the linear guide 4 is about to move in the minus (−) direction in the figures. A spring constant k of the retainer spring 14 is set in the following range.

$$(Fx/x1) < k < (Fx/x2) \tag{1}$$

$$Fx = \mu 1 \cdot M \cdot g + \mu 2(M \cdot g + mr \cdot g + n \cdot mb \cdot g) \tag{2}$$

Here, μ1 represents a coefficient of static friction between the balls 5 and the movable member 3, μ2 represents a coefficient of static friction between the balls 5 and the stage 2a, M represents mass of the movable member 3, g represents gravitational acceleration, n represents the number of balls 5, x1 represents an extension and contraction amount from a free length to a close contact length of the retainer spring 14 (see FIG. 3A), x2 represents an extension and contraction amount from the free length at the time when the retainer 6 reaches an end of an assumed stroke range (Lr) of the retainer spring 14 (see FIG. 3A), mb represents mass of the balls 5, and mr represents mass of the retainer 6. It is assumed that mass of a mounted body to be moved (for example, an optical element) is also included in the mass M of the movable member 3.

Incidentally, when the mass M is mass of the movable member 3 as a single unit and weight of the body to be moved is represented as f, Equation (2) is changed to $$Fx = \mu 1 (M \cdot g + f) + \mu 2 \{(M \cdot g + f + mr \cdot g) + n \cdot mb \cdot g\} \tag{2'}$$

Figure 2A:
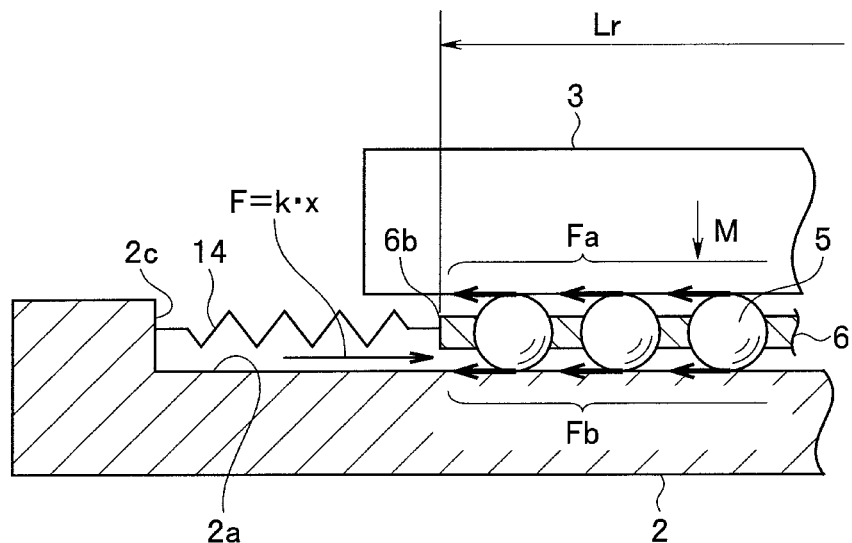
FIG. 2A is a II part enlarged view of FIG. 1 of the slide actuator according to the first embodiment.

Right side first terms of Equations (2) and (2') are a maximum static friction force Fa acting between the balls 5 and the movable member 3 and right side second terms of Equations (2) and (2') are a maximum static friction force Fb acting between the balls 5 and the stage 2a(see FIG. 2A). As shown in FIG. 3A, x1 and x2 have a relation of x1>x2.

When reaction of the retainer spring 14 is represented as F [N] and a displacement amount (an extension and contraction length) of the retainer spring 14 is represented as x [μm], a spring constant k [N/μm] can be calculated by k=F/x.

A first side of Inequality (1) is the spring constant k calculated from a balance between a maximum static friction force (Fa+Fb) acting on the balls 5 when the retainer spring 14 is compressed to the close contact length and reaction F(=k·x) acting on the retainer spring 14. A third side of Inequality (1) is a spring constant calculated from a balance between the maximum static friction force (Fa+Fb) acting on the balls 5 when the end portions 6a and 6b of the retainer 6 are caused to be moved an end portion of the stroke range Lr and the reaction F(=k·x) acting on the retainer spring 14 (see FIG. 2A).

Therefore, since F satisfies F=Fa+Fb in a position where the maximum static friction force (Fa+Fb) acting on the balls 5 and reaction F acting on the retainer spring 14 are balanced, the maximum static friction force (Fa+Fb) can be replaced with the reaction F acting on the retainer spring 14. Therefore, by setting the spring constant k in a range of Inequality (1), when the retainer 6 approaches the wall portion 2c and F satisfies F>Fa+Fb, sliding friction occurs in the balls 5 and the retainer 6 is pushed back.

As a result, even when a strong urging force is applied to at least one of the retainer 6 and the movable member 3 by influence of external force or the like, it is possible to prevent the end portions 6a and 6b of the retainer 6 from coming into contact with the wall portion 2c. Therefore, the end portions 6a and 6b of the retainer 6 are not sunk into a grease reservoir G (see FIGS. 11A to 11D) formed in the wall portion 2c, and are prevented from being affected by viscosity resistance by the grease reservoir G. As a result, positional deviation between the retainer 6 and the movable member 3 is minimized. A control deviation can be corrected early and high position control accuracy can be obtained.

Next, action in this embodiment by such a configuration will be explained. Note that, in the following explanation, a case will be explained where external force acts in a compressing direction (the minus direction) of the retainer spring 14. Concerning an extending direction (the plus direction), since action simply appears as opposite action of the action in the compressing direction. Therefore, explanation is omitted.

In a state in which the flat coils 8a and 8b are not energized, the retainer spring 14 has a free length, the linear guide 4 is stopped in a neutral position as shown in FIG. 1, and the movable member 3 is stopped in a predetermined position on the linear guide 4.

Figure 3B:
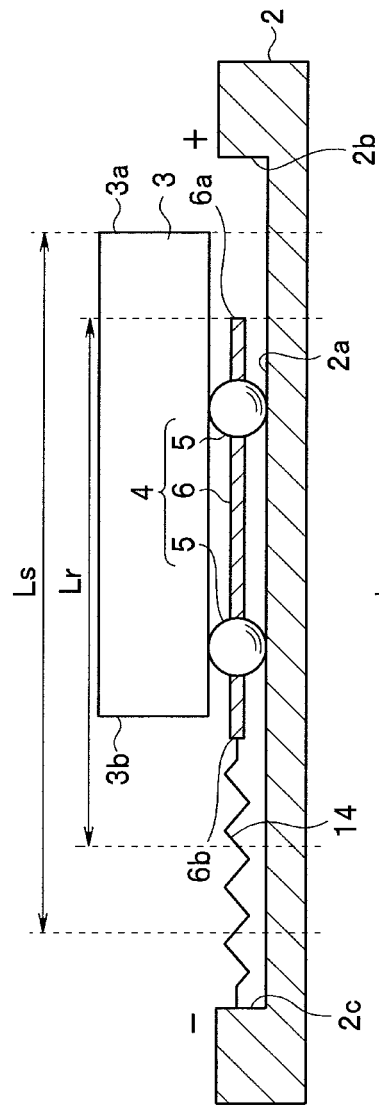
FIG. 3B is a schematic side view of the slide actuator showing a state in which the movable member reaches a moving end of a forward path according to the first embodiment.
Figure 3C:
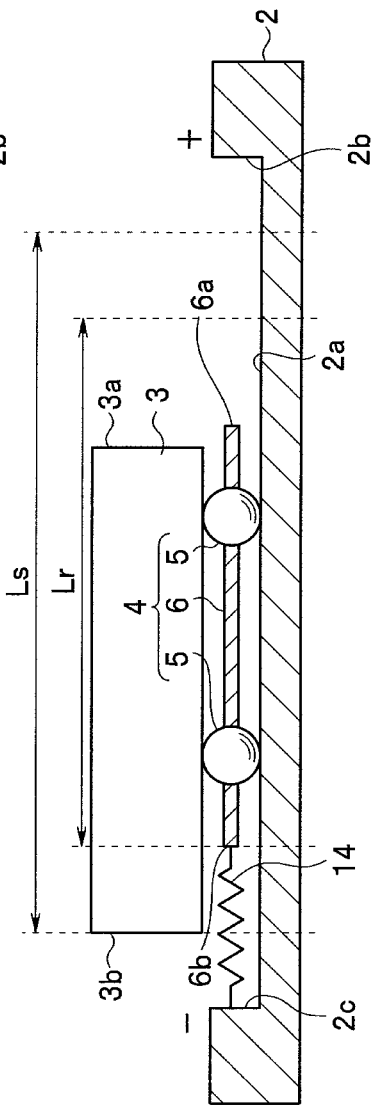
FIG. 3C is a schematic side view of the slide actuator showing a state in which the movable member reaches a moving end of a backward path according to the first embodiment.
Figure 4:
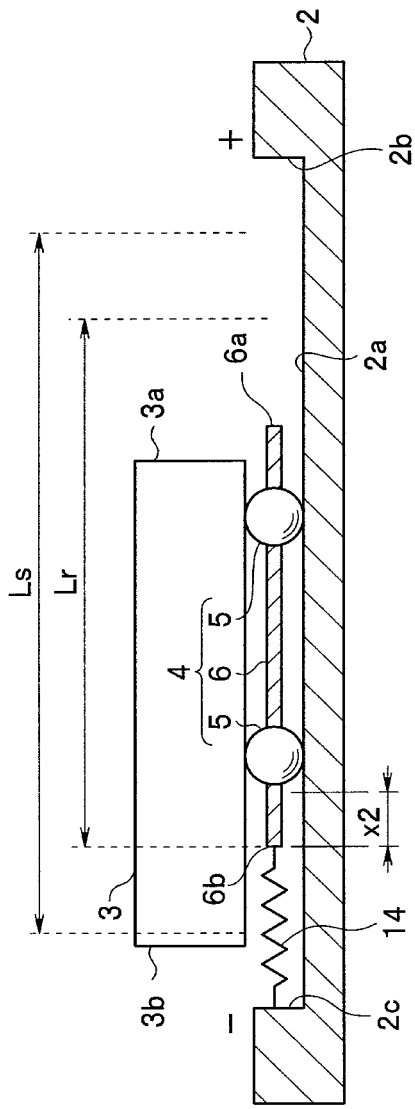
FIG. 4 is a schematic side view of the slide actuator showing a state in which the movable member and a retainer are strongly pressed in one direction by an urging force according to the first embodiment.
Figure 5:
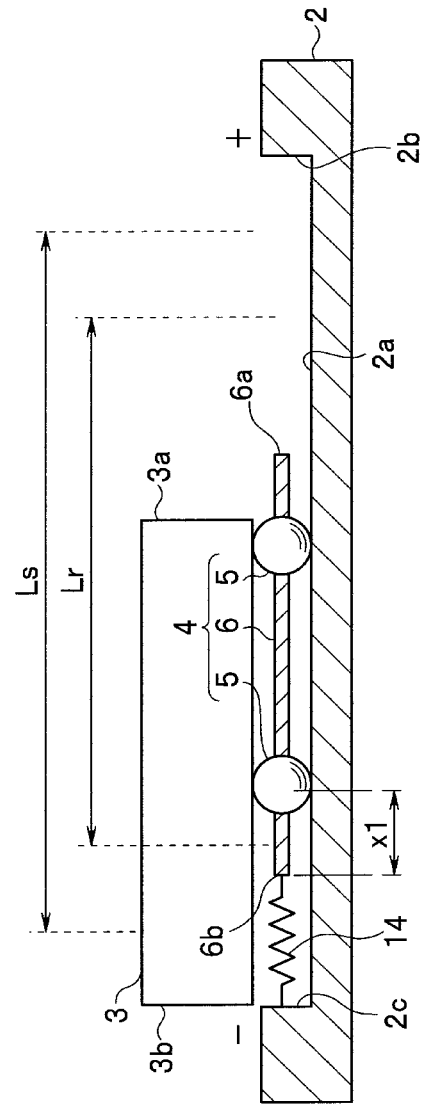
FIG. 5 is a schematic side view of the slide actuator showing a state in which a movable member and a retainer according to another aspect are strongly pressed by an urging force in one direction according to the first embodiment.

In such a state, when the sine-wave movable member instruction value (driving current) as shown in FIG. 6A is fed from the actuator driving section 12 to the flat coils 8a and 8b according to a PWM signal from the actuator control section 11, the movable member 3 linearly moves in a reciprocating manner in the stroke range Ls. As shown in FIG. 3B and FIG. 3C, when the movable member 3 moves, the balls 5 of the linear guide 4 rotates with rolling friction. The retainer 6 follows the movable member 3 in a reciprocating manner in the stroke range Lr with a half of a movement amount of the movable member 3.

At that time, the retainer spring 14 for both tension and contraction that couples the end portion 6b of the retainer 6 and the wall portion 2c repeats extension and compression. The spring constant k is set such that the reaction F(=k·x) in the stroke range Lr of the retainer spring 14 is smaller than a value obtained by adding the maximum static friction force Fa acting between the balls 5 and the movable member 3 and the maximum static friction force Fb acting between the balls 5 and the stage 2a (F<Fa+Fb). Accordingly, even if the retainer 6 is urged to an opposite side of the moving direction by the reaction F of the retainer spring 14, a slip does not occur between the balls 5 and the movable member 3 and the stage 2a.

Figure 2B:
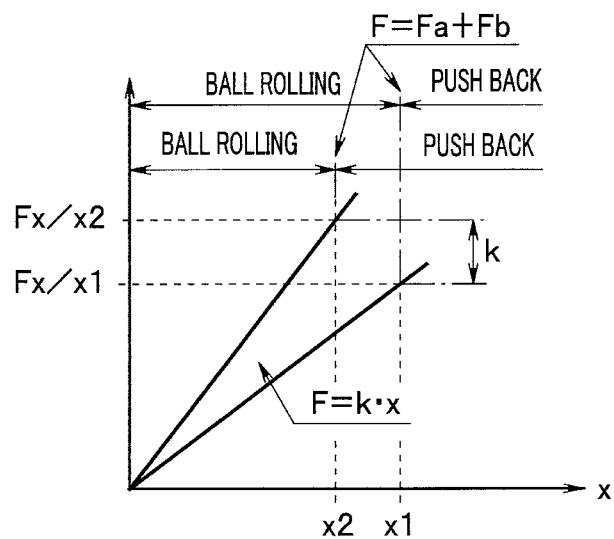
FIG. 2B is an explanatory diagram showing a region of reaction from a relation between displacement of a retainer spring and a spring constant according to the first embodiment.

When the spring constant k of the retainer spring 14 is set to the third side of Inequality (1), that is, the extension and contraction amount x from the free length of the retainer spring 14 shown in FIG. 2B is set slightly longer than x2, F satisfies F>Fa+Fb in a part where the end portion 6b of the retainer 6 slightly moves beyond an end portion on a minus side of the stroke range Lr.

Therefore, when the end portion 6b of the retainer 6 moves beyond the stroke range Lr because strong external force is applied to at least one of the movable member 3 and the linear guide 4 because of influence of disturbance or the like, the extension and contraction amount x of the retainer spring 14 exceeds x2 and F satisfies F>Fa+Fb. Then, sliding friction occurs between the balls 5 and the movable member 3 and between the balls 5 and the stage 2a. The retainer 6 is pressed in a returning direction.

On the other hand, a movement amount of the movable member 3 is controlled by the actuator control section 11. In other words, the actuator control section 11 compares the position information of the movable member 3 detected by the position detection sensor 13 and the movable member instruction position shown in FIG. 6A, calculates the control deviation ΔLs shown in FIG. 6B, and performs feedback control such that the control deviation ΔLs converges. Accordingly, even if the control deviation ΔLs occurs in the movable member 3 because of the influence of disturbance or the like, the control deviation ΔLs is immediately corrected.

As a result, even when strong external force is applied to at least one of the retainer 6 and the movable member 3 by disturbance, relative positions of the movable member 3 and the retainer 6 do not greatly deviate. Sliding friction that occurs between the movable member 3 and the balls 5 is minimized. Deterioration in friction durability can be suppressed.

When the spring constant k of the retainer spring 14 is set to the first side of Inequality (1), that is, the extension and contraction amount x from the free length of the retainer spring 14 shown in FIG. 2B is set slightly shorter than x1, F satisfies F>Fa+Fb before the end portion 6b of the retainer 6 reaches the close contact length of the retainer spring 14.

Therefore, when the extension and contraction amount x of the retainer spring 14 approaches x1 and F satisfies F>Fa+Fb because strong external force is applied to at least one of the movable member 3 and the linear guide 4 because of influence of disturbance or the like, sliding friction occurs between the balls 5 and the movable member 3 and between the balls 5 and the stage 2a. The retainer 6 is pressed in the returning direction. On the other hand, a movement amount of the movable member 3 is feedback-controlled by the actuator control section 11 as explained above.

As a result, even when strong external force is applied to at least one of the retainer 6 and the movable member 3 by disturbance, relative positions of the movable member 3 and the retainer 6 do not greatly deviate.

By setting the spring constant k of the retainer spring 14 in the range of Inequality (1) in this way, even when external force is applied to at least one of the retainer 6 and the movable member 3 because of being affected by disturbance or the like, the end portions 6a and 6b of the retainer 6 do not come into contact with the wall portions 2b and 2c.

Therefore, the end portions 6a and 6b of the retainer 6 are not sunk into the grease reservoir G formed in the wall portions 2b and 2c. The retainer 6 can be reversed without being affected by viscosity resistance of the grease reservoir G. As a result, positional deviation between the retainer 6 and the movable member 3 is minimized. A control deviation of the movable member 3 can be corrected early and high position control accuracy can be obtained. Note that the retainer spring 14 may couple the end portion 6a of the retainer 6 and the wall portion 2b opposed to the end portion 6a.

[Second Embodiment]

Figure 7:
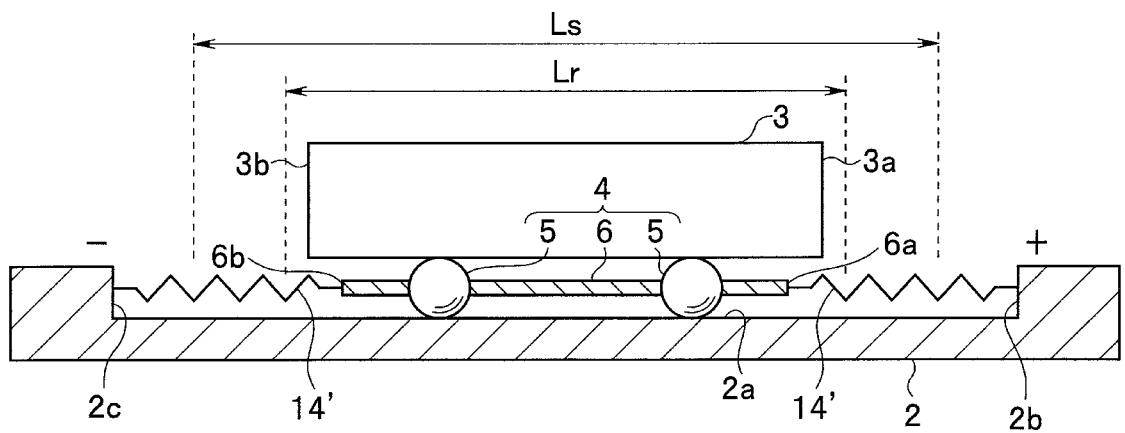
FIG. 7 is a schematic side view of a slide actuator according to a second embodiment.

A second embodiment of the present invention is shown in FIG. 7. Note that the same components as the components in the first embodiment are denoted by the same reference numerals and signs and explanation of the components is omitted or simplified.

In the first embodiment explained above, the retainer spring 14 is coupled between one end portion 6b(6a) of the retainer 6 and the wall portion 2c(2b). However, in this embodiment, both of the end portions 6a and 6b of the retainer 6 and the wall portions 2b and 2c of the fixed member 2, respectively, opposed to the end portions 6a and 6b are coupled by mechanical retainer springs 14'.

Since the retainer springs 14' are disposed on both sides of the retainer 6, a spring constant k' of the retainer springs 14' is set to a half of the spring constant k of the retainer spring 14 in the first embodiment explained above.

Therefore, Inequality (1) in the first embodiment is changed in this embodiment as follows:

$$(Fx/x1)/2 < k' < (Fx/x2)/2 \qquad (1')$$

In this case, the reaction F acting on the retainer 6 is a double of reaction F' from the retainer springs 14' on both the sides (F←2F').

The retainer springs 14' are not limited to a spring for both of tension and compression and may be a compression spring or a tension spring. Irrespective of the types of these springs, the retainer springs 14' have a free length and a close contact length that can secure extension and contraction amounts x1 and x2 of the retainer springs 14'. As shown in the figures, in an initial state, the retainer springs 14' are set to a balance for standing still in a neutral position.

With such a configuration, when the spring constant k' set in both the retainer springs 14' is set to a third side of Inequality (1'), F satisfies F>Fa+Fb in a part where the end portion 6b(6a) of the retainer 6 slightly moves beyond an end portion on a minus side (a plus side) of the stroke range Lr.

Therefore, when the end portion 6b of the retainer 6 moves beyond the stroke range Lr with strong external force applied to at least one of the movable member 3 and the linear guide 4 because of influence of disturbance or the like, the extension and contraction amount x of the retainer springs 14' exceeds x2 and F satisfies F>Fa+Fb. Then, sliding friction occurs between the balls 5 and the movable member 3 and between the balls 5 and the stage 2a. The retainer 6 is pressed in a returning direction.

When the spring constant k' of the retainer springs 14' is set to a first side of Inequality (1'), F satisfies F>Fa+Fb before the end portion 6b of the retainer 6 reaches the close contact length of the retainer springs 14'. Therefore, when the extension and contraction amount x of the retainer springs 14' approach x1 with external force applied to at least one of the movable member 3 and the linear guide 4 because of influence of disturbance or the like and F satisfies F>Fa+Fb, sliding friction occurs between the balls 5 and the movable member 3 and between the balls 5 and the stage 2a. The retainer 6 is pressed in a returning direction.

In this embodiment, since the retainer springs 14' are disposed on both the sides of the retainer 6, in addition to the effects of the first embodiment explained above, when the retainer 6 moves beyond the stroke range Lr with external force, the retainer 6 can be quickly pushed back. A relative position to the movable member 3 can be corrected earlier.

[Third Embodiment]

Figure 8:
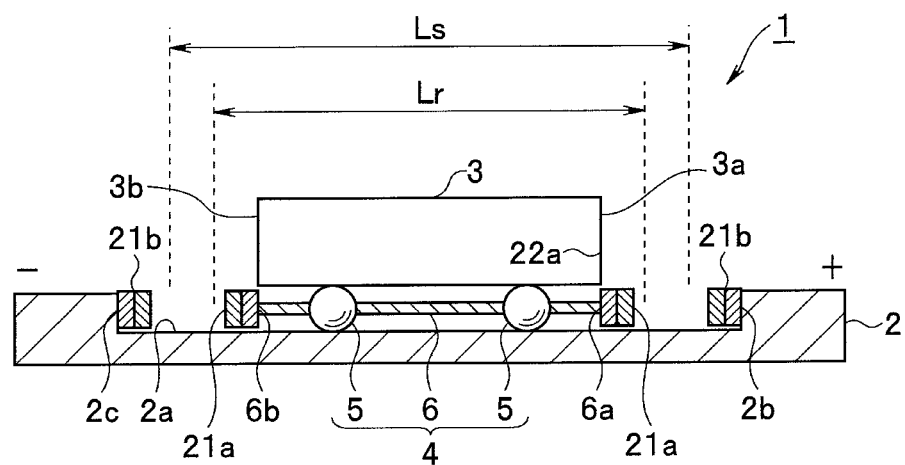
FIG. 8 is a schematic side view of a slide actuator according to a third embodiment.

A third embodiment of the present invention is shown in FIG. 8. In this embodiment, it is assumed that a structure having spring properties is a magnetic spring. Note that the same components as the components in the first embodiment are denoted by the same reference numerals and signs and explanation of the components is omitted or simplified.

In other words, retainer magnets 21a and 21b, which are permanent magnets, are disposed at both the end portions 6a and 6b of the retainer 6 and in the wall portions 2b and 2c of the fixed member 2 opposed to the end portions 6a and 6b in a state in which the same magnetic poles are opposed. As a result, magnetic forces in directions repulsing each other (repulsive magnetic forces) act as a magnetic spring between the retainer magnets 21a and 21b opposed to each other.

The spring constant k' between the retainer magnets 21a and 21b acting as the magnetic spring is set in the range of Inequality (1') in the second embodiment. Note that a range in which the repulsive magnetic forces act between the retainer magnets 21a and 21b is set in a range longer than the stroke range Lr of the linear guide 4 and including at least extension and contraction amounts x1 to x2 corresponding to the spring constant k' set by the extension and contraction amount x explained above. Note that the extension and contraction amount xl is a position with which the retainer magnets 21a and 21b are brought into contact.

With such a configuration, when the spring constant k' set between the retainer magnets 21a and 21b on both sides is set to the third side of Inequality (1'), F satisfies F>Fa+Fb in a part where the end portion 6b(6a) of the retainer 6 slightly moves beyond an end portion on a minus side (a plus side) of the stroke range Lr.

Therefore, when the end portion 6b of the retainer 6 moves beyond the stroke range Lr with strong external force applied to at least one of the movable member 3 and the linear guide 4 because of influence of disturbance or the like, the extension and contraction amount x between the retainer magnets 21a and 21b exceeds x2 and F satisfies F>Fa+Fb. Then, sliding friction occurs between the balls 5 and the movable member 3 and between the balls 5 and the stage 2a. The retainer 6 is pressed by a repulsive magnetic force in a returning direction.

When the spring constant k' between the retainer magnets 21a and 21b is set to the first side of Inequality (1'), F satisfies F>Fa+Fb before the end portion 6b of the retainer 6 reaches a contact position between the retainer magnets 21a and 21b. Therefore, when the extension and contraction amount x between the retainer magnets 21a and 21b approaches x1 with external force applied to at least one of the movable member 3 and the linear guide 4 because of influence of disturbance or the like and F satisfies F>Fa+Fb, sliding friction occurs between the balls 5 and the movable member 3 and between the balls 5 and the stage 2a. The retainer 6 is pressed in the returning direction by a repulsive magnetic force.

In this embodiment, by disposing the retainer magnets 21a and 21b on both the sides of the retainer 6, the same effects as the effects in the second embodiment explained above can be obtained.

By making the retainer magnets 21a and 21b opposed to each other to be different magnetic poles and causing magnetic forces in directions attracting each other (attractive magnetic forces) to act as magnetic springs, the same action effects as the action effects obtained when it is assumed that the retainer springs 14' in the second embodiment are the tension springs can be obtained.

[Fourth Embodiment]

Figure 9:
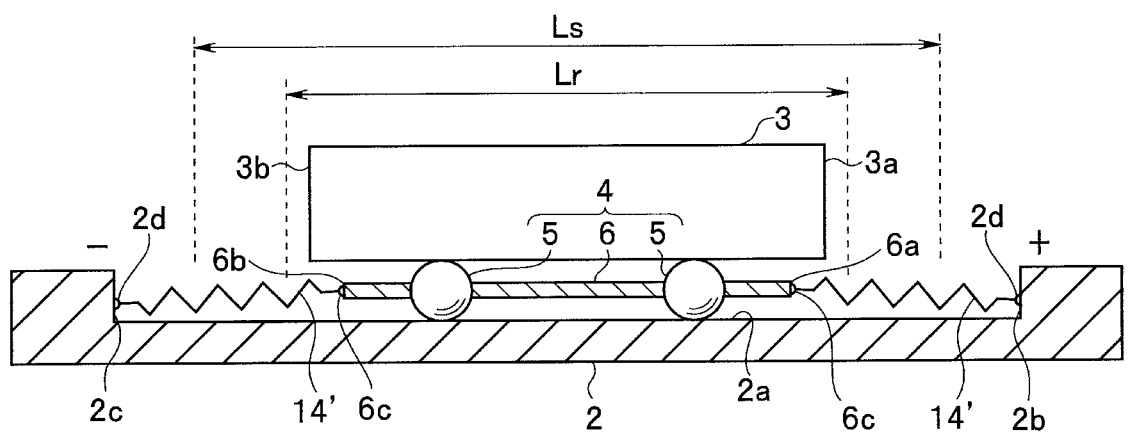
FIG. 9 is a schematic side view of a slide actuator according to a fourth embodiment.
Figure 10A:
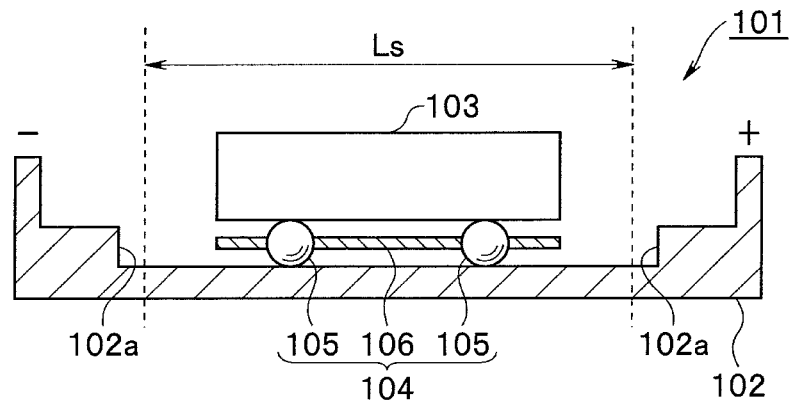
FIG. 10A is a schematic side view of a slide actuator showing a conventional example and showing a state in which a movable member is in an initial position.
Figure 10B:
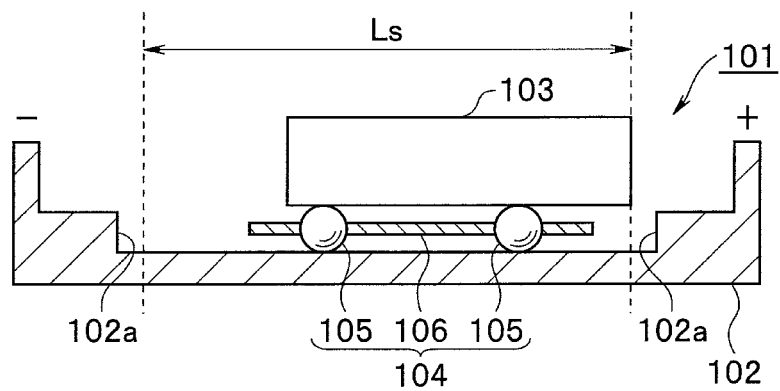
FIG. 10B is a schematic side view of the slide actuator showing the conventional example and showing a state in which the movable member reaches a moving end of a forward path.
Figure 10C:
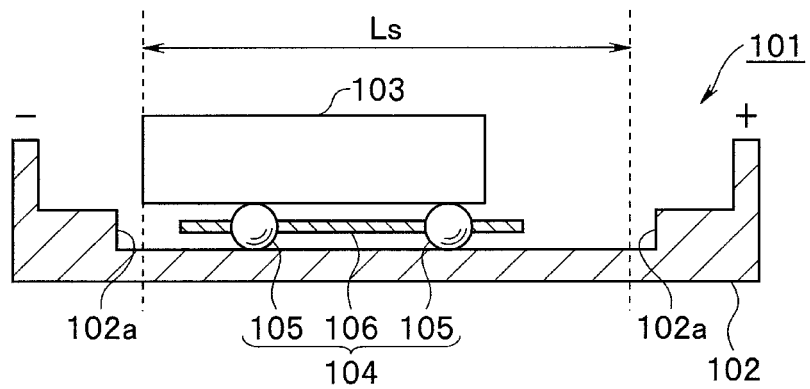
FIG. 10C is a schematic side view of the slide actuator showing the conventional example and showing a state in which the movable member reaches a moving end of a backward path.
Figure 11A:
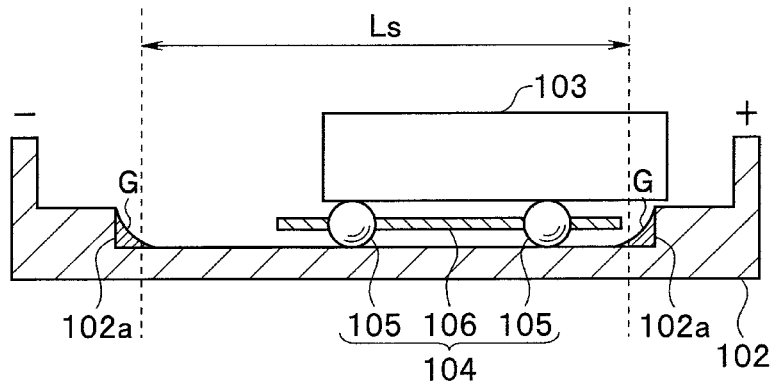
FIG. 11A is a schematic side view of the slide actuator showing the conventional example and showing a state in which the movable member is urged in a forward path direction by an urging force due to disturbance.
Figure 11B:
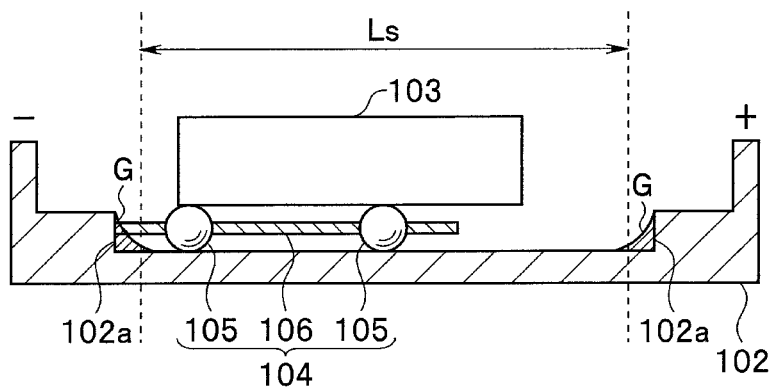
FIG. 11B is a schematic side view of the slide actuator showing the conventional example and showing a state in which a retainer is in contact with a wall portion of the backward path.
Figure 11C:
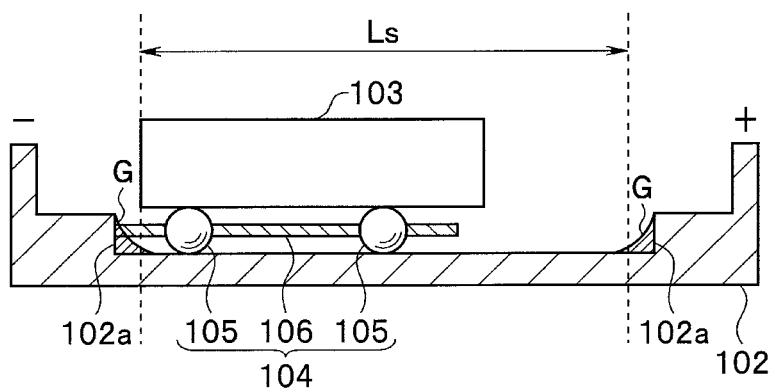
FIG. 11C is a schematic side view of the slide actuator showing the conventional example and showing a state in which the movable member is caused to be slid to a moving end.
Figure 11D:
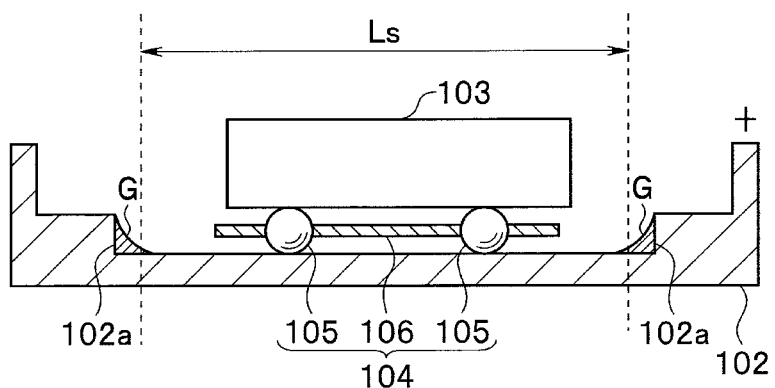
FIG. 11D is a schematic side view of the slide actuator showing the conventional example and showing a state in which the movable member passes an initial position.

A fourth embodiment of the present invention is shown in FIG. 9. This embodiment is a modification of the second embodiment explained above. The same components as the components in the second embodiment are denoted by the same reference numerals and signs and explanation of the components is omitted or simplified.

In this embodiment, one ends of the retainer springs 14' are coupled to both the end portions 6a and 6b of the retainer 6 via link members 6c swingably in an up-down direction. The other ends of the retainer springs 14' are coupled to lower parts of the wall portions 2b and 2c via link members 2d swingably in the up-down direction.

The retainer springs 14' are tension springs and always urge the retainer 6 in an oblique downward direction, that is, in a direction in which the balls 5 are pressed against the stage 2a. Note that operations of the movable member 3 and the linear guide 4 at the time when the movable member 3 linearly moves in a reciprocating manner and operations at the time when at least one of the movable member 3 and the retainer 6 is pressed by strong external force are the same operations as the operations in the second embodiment. Therefore, explanation of the operations is omitted.

When the balls 5 rotate with rolling friction between the movable member 3 and the stage 2a and move with a half of a movement amount of the movable member 3, the balls 5 are always pressed against the stage 2a by the retainer springs 14'. Therefore, at least in reciprocating linear movement in the stroke range Lr, sliding friction less easily occurs between the balls 5 and the stage 2a. Therefore, sliding friction between the movable member 3 and the balls 5 also less easily occurs. Friction durability of the movable member 3 can be improved.

What is claimed is:

1. A slide actuator comprising:
   a fixed member;
   a movable member capable of reciprocating in a predetermined direction with respect to the fixed member;
   a plurality of balls interposed between the fixed member and the movable member and configured to movably support the movable member;
   a retainer interposed between the respective balls and configured to keep an interval between the respective balls constant and reciprocate in a predetermined stroke range;
   a wall portion of the fixed member provided in a moving direction of the retainer; and
   a structure having spring properties configured to couple the wall portion and the retainer, wherein
   the structure is disposed to suppress displacement of the retainer in the moving direction, and
   a spring constant of the structure is set to a value for causing sliding friction in the balls and pushing back the retainer in a range in which the retainer moves beyond the predetermined stroke range.

2. The slide actuator according to claim 1, wherein the structure is a spring for both of tension and compression provided on one side of the retainer.

3. The slide actuator according to claim 2, wherein a spring constant k of the spring for both of tension and compression is set in a range of $(Fx/x1)<k<(Fx/x2)$, where the Fx is a value obtained by adding up a maximum static friction force between the balls and the movable member and a maximum static friction force between the balls and the fixed member, the x1 is an extension and contraction amount from a free length to a close contact length of the spring for both of tension and compression, and the x2 is an extension and contraction amount from the free length at a time when the retainer reaches an end of an assumed stroke range of the spring for both of tension and compression.

4. The slide actuator according to claim 1, wherein the structure is provided on both sides of the retainer.

5. The slide actuator according to claim 4, wherein a spring constant k' of the structure provided on both the sides of the retainer is set in a range of $(Fx/x1)/2<k'<(Fx/x2)/2$, where the Fx is a value obtained by adding up a maximum static friction force between the balls and the movable member and a maximum static friction force between the balls and the fixed member, the x1 is an extension and contraction amount from a free length to a close contact length of the structure, and the x2 is an extension and contraction amount from the free length at a time when the retainer reaches an end of an assumed stroke range of the structure.

6. The slide actuator according to claim 4, wherein the structure is a tension spring.

7. The slide actuator according to claim 4, wherein the structure is a compression spring.

8. The slide actuator according to claim 4, wherein the structure is a magnetic spring.

9. The slide actuator according to claim 6, wherein one end of the tension spring is coupled to the retainer and another end of the tension spring is coupled to the wall portion in a state in which the other end is caused to be urged in a direction in which the balls are pressed against the fixed member via the retainer.

10. The slide actuator according to claim 4, wherein the structure is a spring for both of tension and compression.

11. A voice coil motor comprising the slide actuator according to claim 1.

\* \* \* \* \*